(12) United States Patent
Burka et al.

(10) Patent No.: US 9,152,575 B2
(45) Date of Patent: Oct. 6, 2015

(54) DATA STAGING AREA

(71) Applicant: International Business Machines Corporation, Armonk, NY (US)

(72) Inventors: Peter Wiebe Burka, Ottawa (CA); Jeffrey Michael Disher, Kitchener (CA); Elijah El-Haddad, Ottawa (CA); Aleksandar Micic, Ottawa (CA); Ryan Andrew Sciampacone, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/633,079

(22) Filed: Feb. 26, 2015

(65) Prior Publication Data

US 2015/0169471 A1    Jun. 18, 2015

Related U.S. Application Data

(63) Continuation of application No. 13/356,010, filed on Jan. 23, 2012, now Pat. No. 8,972,680.

(51) Int. Cl.
| | |
|---|---|
| *G06F 13/00* | (2006.01) |
| *G06F 12/12* | (2006.01) |
| *G06F 12/08* | (2006.01) |
| *G06F 12/10* | (2006.01) |

(52) U.S. Cl.
CPC .......... *G06F 12/122* (2013.01); *G06F 12/0833* (2013.01); *G06F 12/1054* (2013.01); *G06F 2212/62* (2013.01); *G06F 2212/65* (2013.01); *G06F 2212/69* (2013.01)

(58) Field of Classification Search
CPC combination set(s) only.
See application file for complete search history.

(56) References Cited

U.S. PATENT DOCUMENTS

| | | | |
|---|---|---|---|
| 4,603,382 | A | 7/1986 | Cole et al. |
| 5,155,835 | A | 10/1992 | Belsan |
| 7,124,272 | B1 | 10/2006 | Kennedy et al. |
| 7,984,259 | B1 | 7/2011 | English |
| 8,042,102 | B2 | 10/2011 | Dewitt, Jr. et al. |
| 2001/0018728 | A1 | 8/2001 | Topham et al. |
| 2006/0004957 | A1 | 1/2006 | Hand et al. |
| 2007/0011421 | A1 | 1/2007 | Keller, Jr. et al. |
| 2008/0005475 | A1 | 1/2008 | Lubbers et al. |
| 2009/0106518 | A1 | 4/2009 | Dow |
| 2009/0228669 | A1 | 9/2009 | Slesarev et al. |
| 2010/0235569 | A1 | 9/2010 | Nishimoto et al. |
| 2011/0087657 | A1 | 4/2011 | Jensen et al. |
| 2011/0252210 | A1 | 10/2011 | Davies |

FOREIGN PATENT DOCUMENTS

WO    2010104505 A1    9/2010

*Primary Examiner* — Charles Rones
*Assistant Examiner* — Han Doan
(74) *Attorney, Agent, or Firm* — Steven M. Greenberg, Esq.; CRGO LAW

(57) ABSTRACT

An illustrative embodiment of a computer-implemented process for managing a staging area creates the staging area for identified candidate cold objects, moves the identified candidate objects into the staging area, tracks application access to memory comprising the staging area and determines whether frequency of use information for a specific object exceeds a predetermined threshold. Responsive to a determination that the frequency of use information for the specific object exceeds a predetermined threshold, move the specific object into a regular area and determine whether a current time exceeds a predetermined threshold. Responsive to a determination that the current time exceeds a predetermined threshold, the computer-implemented process moves remaining objects from the staging area to a cold area.

20 Claims, 7 Drawing Sheets

Memory manager 300

DATA STAGING AREA

CROSS-REFERENCE TO RELATED APPLICATION

This application is a Continuation of U.S. application Ser. No. 13/356,010, filed Jan. 23, 2012, U.S. Pat. No. 8,972,680, which is incorporated herein by reference in their entirety.

BACKGROUND

1. Technical Field

This disclosure relates generally to memory management in a data processing system and more specifically to managing data staging in the data processing system.

2. Description of the Related Art

As several different performing tiers in memory become more prevalent the underlying physical memory in computer systems becomes less uniform. Moreover, with the emergence of cloud computing technologies use of virtualized environments is growing in an effort to utilize machines to a fullest capacity with respect to processors and memory.

Application memory space is typically spread across several different underlying physical memory implementations, each potentially having a different access speed. Thus, there is a strong need for distributing application data in an access frequency conscious manner. Placing most frequently accessed, or more popular, data on a fastest physical memory ensures optimal application performance, reduces power consumption and allows for a highest level of hardware utilization.

To address the challenge several data access frequency detection methods have been developed. Combining a data access frequency detection method with a memory management system, such as a garbage collector associated with a virtual machine of a managed runtime, results in an ability to intelligently distribute data associated with an application in a tiered memory environment. Better distribution typically improves overall data access times of the application.

However, perfectly accurate data access frequency detection has a very large negative impact on application performance. The data access frequency detection methods must therefore sacrifice a certain level of accuracy to have a lower runtime overhead. Reduced accuracy typically causes certain pieces of very frequently accessed data to be missed by a popularity detection process. The movement of even a few highly popular data items (or objects) to a slower form of memory may greatly lower the performance of the application.

SUMMARY

According to one embodiment, a computer-implemented process for managing a staging area creates the staging area for identified candidate cold objects, moves the identified candidate objects into the staging area, tracks application access to memory comprising the staging area and determines whether frequency of use information for a specific object exceeds a predetermined threshold. Responsive to a determination that the frequency of use information for the specific object exceeds a predetermined threshold, move the specific object into a regular area and determine whether a current time exceeds a predetermined threshold. Responsive to a determination that the current time exceeds a predetermined threshold, the computer-implemented process moves remaining objects from the staging area to a cold area.

According to another embodiment, a computer program product for managing a staging area comprises a computer recordable-type media containing computer executable program code stored thereon. The computer executable program code comprises computer executable program code for creating the staging area for identified candidate cold objects, creating the staging area for identified candidate cold objects, computer executable program code for moving the identified candidate objects into the staging area, computer executable program code for tracking application access to memory comprising the staging area, computer executable program code for determining whether frequency of use information for a specific object exceeds a predetermined threshold, computer executable program code responsive to a determination that the frequency of use information for the specific object exceeds a predetermined threshold for moving the specific object into a regular area, computer executable program code for determining whether a current time exceeds a predetermined threshold and computer executable program code responsive to a determination that the current time exceeds a predetermined threshold, for moving remaining objects from the staging area to a cold area.

According to another embodiment, an apparatus for managing a staging area comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to create the staging area for identified candidate cold objects, create the staging area for identified candidate cold objects, move the identified candidate objects into the staging area, track application access to memory comprising the staging area, determine whether frequency of use information for a specific object exceeds a predetermined threshold, responsive to a determination that the frequency of use information for the specific object exceeds a predetermined threshold, move the specific object into a regular area, determine whether a current time exceeds a predetermined threshold and responsive to a determination that the current time exceeds a predetermined threshold, move remaining objects from the staging area to a cold area.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
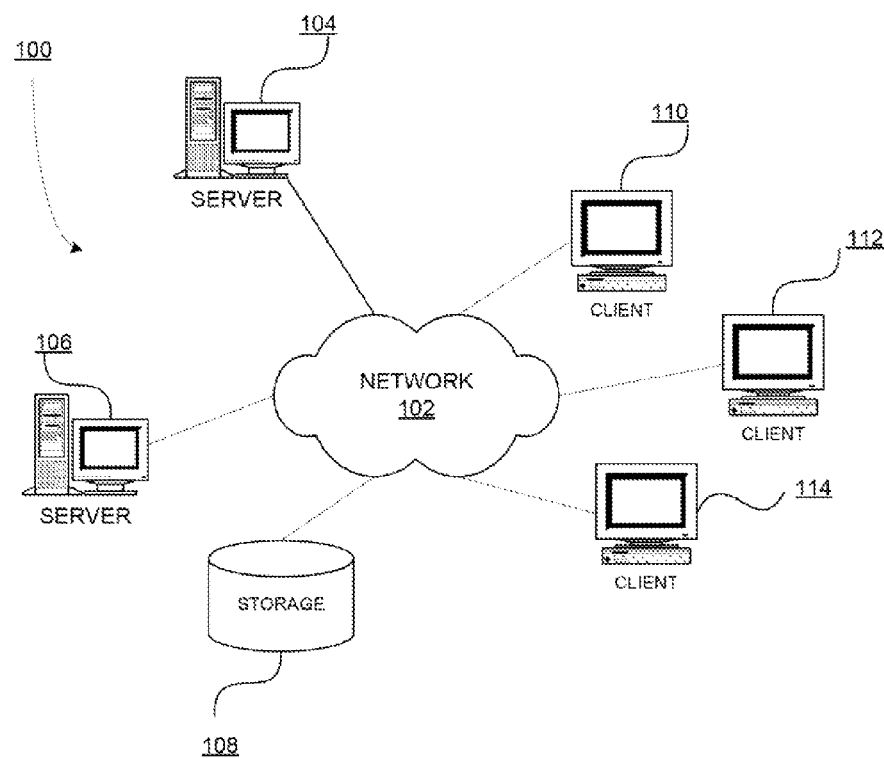
FIG. 1 is a block diagram of an exemplary network data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
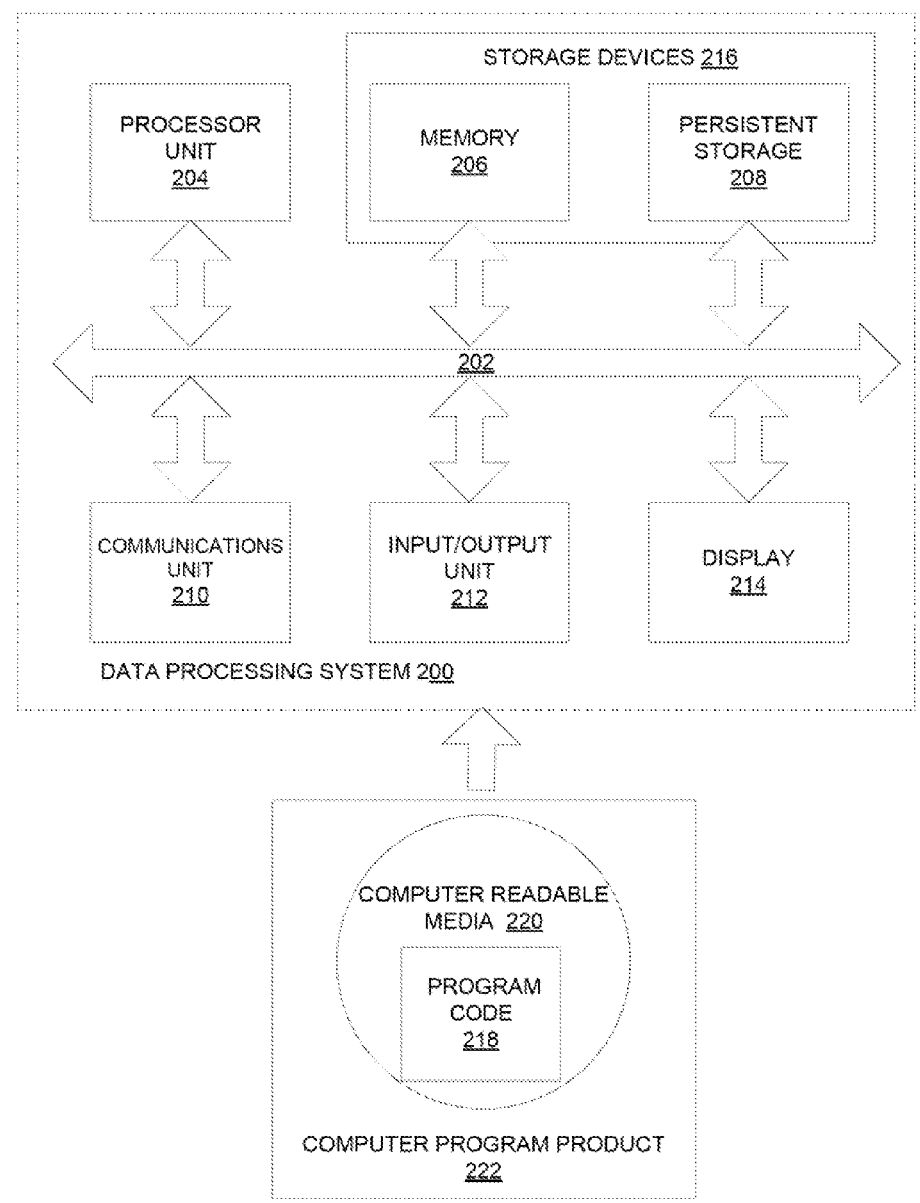
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage such as a hard drive, a thumb drive, or a flash memory that is connected to data processing system 200. The tangible form of computer readable storage media 220 is also referred to as computer recordable storage media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for managing a staging area is presented. Processor unit 204 creates the staging area for identified candidate objects, moves the identified candidate objects into the staging area, using storage devices 216, tracks application access to memory of storage devices 216 comprising the staging area and determines whether frequency of use information for a specific object exceeds a predetermined threshold. Responsive to a determination that the frequency of use information for the specific object exceeds a predetermined threshold, processor unit 204 moves the specific object into a regular area and determines whether a current time exceeds a predetermined threshold. Responsive to a determination that the current time exceeds a predetermined threshold, processor unit 204 moves remaining objects from the staging area to a cold area.

An embodiment of the disclosed process provides a typically low overhead staging area into which seemingly infrequently accessed objects are relocated for a certain period of time before deciding whether the objects are truly unpopular and moved to a relatively slower physical memory. Creating a staging area enables an opportunity to test data segregation results of a running system to verify potential consequences of further movement of data objects. Data, which is deemed frequently accessed through profiling, can be moved back out of the staging area; data that is infrequently accessed can then be moved to a lower tiered storage layer.

Figure 3:
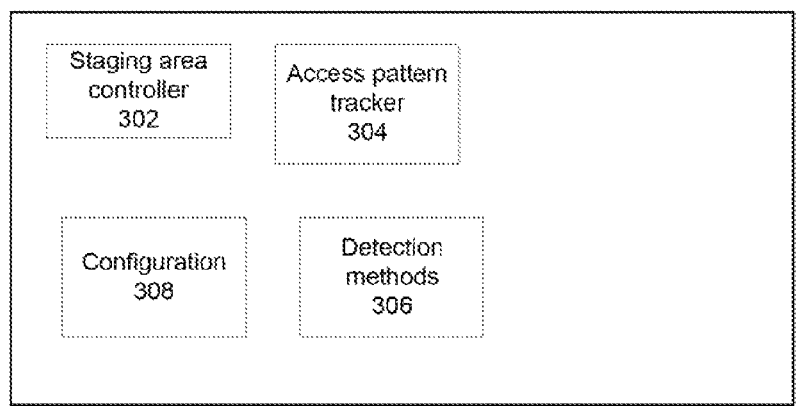
FIG. 3 is a block diagram of a memory manager operable for various embodiments of the disclosure.

With reference to FIG. 3 a block diagram of a memory manager in accordance, with various embodiments of the disclosure is presented. Memory manager 300 is an example of an embodiment providing a capability to create, and manage utilization of a storage tier within a hierarchy of storage. The storage hierarchy comprises a number of types and speeds of memory ranging between a highest priority and a lowest priority.

Memory manager 300 comprises functional elements including staging area controller 302, access pattern tracker 304, detection methods 306 and configuration 308. Memory manager 300 and associated components all leverage support from an underlying data processing system such as data processing system 200 of FIG. 2 or a data processing system within network of data processing system 100 of FIG. 1. Functional elements of memory manager 300 may be implemented as discrete physical components within memory manager 300 or as logical units incorporated functionally within memory manager 300. Memory manager 300 provides a capability to manage memory location of objects using a fine-grained process on a per object basis rather than a more course grained page basis.

Staging area controller 302 provides a capability to create and remove a staging area of memory as well as identify objects as candidates for movement into and out of the staging area. A staging area is a data structure maintained by staging area controller 302, which is logically part of a regular memory area. The staging area may be created from a previously allocated physical portion of a regular memory area or from a separate allocation, which is viewed as logically, associated with the regular memory area.

Access pattern tracker 304 provides a set of methods used to identify and maintain information associated with an application access of data objects. The access patterns of objects in the memory, including the staging area can be tracked using a selected method or a combination of methods including traditional read/write barriers, page protection mechanisms, memory cache/translation look aside buffer (TLB) frequency data, hardware assisted profiling, and other similar techniques. Information typically maintained in a data structure includes, for example, access frequency information including an access count that is incremented as a result of an access of a respective object in the memory and a time of last access.

Detection methods 306 provides a set of methods used to identify and rank objects in memory according to associated utilization information. For example a popularity detection method may be selected from the set of methods and used to gather information based on access requests for objects comprising a set of objects in a regular memory. The popularity detection method typically ranks each object according to a number of accesses as a form of access frequency. A higher ranked object has more data accesses than a lower ranked object. A time of last access may also be used to provide another indication of recent access.

In the current example, using a staging area in combination with a popularity detection method rather than relying entirely on the method alone enables typical adverse effects of popularity detection errors to be reduced. The staging area is designed to have much lower data access overhead than a slower tiered storage beyond traditional dynamic random access memory (DRAM). The lower overhead implies when an object is accessed frequently by an application but is missed by the popularity detection method the overall performance is typically not as adversely affected when the object is placed in the staging area compared to when moved directly to the slower physical memory.

While the popularity detection method relies on probabilistic or sampling approaches to detect popularity, the staging area detects all actual object access providing a much more accurate representation of popularity. Use of the staging area in combination with popularity detection also enables automatic popularity detection tuning. The staging area can be used to programmatically tune parameters of the popularity detection method by uncovering access patterns in popular objects missed the popularity detection method.

The staging area with popularity detection adds more flexibility to the popularity detection method. The staging area provides a degree of flexibility in terms of how stringent the popularity detection algorithm must be in order to be effective enabling the popularity detection method to be configured to sacrifice more accuracy for the sake of speed.

Configuration 308 provides a capability to direct or control the operation of memory manager 300. Configuration information includes a set of operational information comprising a value for a location (for example, path information, range of memory) used to create a staging area, a size of the staging area including initial size and maximum size as well as a time period threshold indicating when to clean the staging area. The staging area is typically dynamically created when needed. However, in certain situations a static dedicated staging area may be required. For example, using certain specialized hardware solutions as a separate piece of dedicated memory, which is faster than the cold area storage but also allows access tracking, provides a capability for exclusive use as a staging area. The dedicated memory, for example a solid-state disk, is specifically initialized and maintained for use as the staging area.

Figure 4:
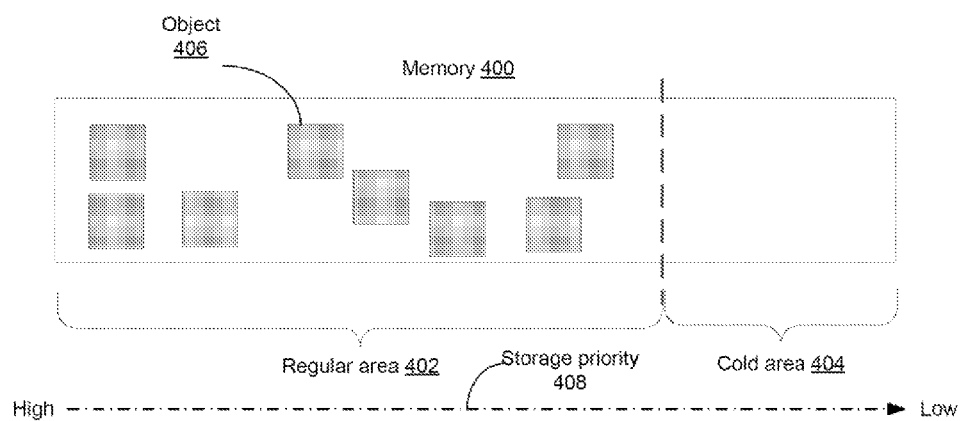
FIG. 4 is a block diagram of a memory configuration managed by a memory manager in accordance with one embodiment of the disclosure.

With reference to FIG. 4 a block diagram of a memory configuration managed by a memory manager in accordance, with various embodiments of the disclosure is presented. Memory 400 is presented in a logical view wherein portions of the memory depicted need not be implemented as a physical unit using a same type or speed of memory. Memory 400 is an example of a memory managed by memory manager 300 of FIG. 3.

Memory 400 comprises a number of portions including regular area 402 and cold area 404. A set of objects is maintained within memory 400 such as object 406 shown placed within regular area 402, but may be located in other locations equally well within the memory. Currently used objects are typically located in regular area 402 while infrequently used objects tend to migrate to cold area 404.

Memory 400 is arranged logically according to storage priority 408. Storage priority 408 indicates an arrangement of memory from a high priority associated with a portion of regular area 402 furthest from a portion of cold area 404 to a low priority associated with a portion of cold area 404 furthest from a portion of regular area 402. Currently used objects are typically located in regular area 402 while infrequently used objects tend to migrate to cold area 404.

Staging controller 302 of memory manager 300 of FIG. 3 uses popularity data gathered by a data access frequency method to determine which area of a memory to convert into a staging area. In one example, memory 400 is a regular Java heap. Before the popularity detection method has had enough time to determine which objects are hot (popular) or cold (unpopular) there is no need to convert a portion of regular area 402 and protecting the portion of memory.

Figure 5:
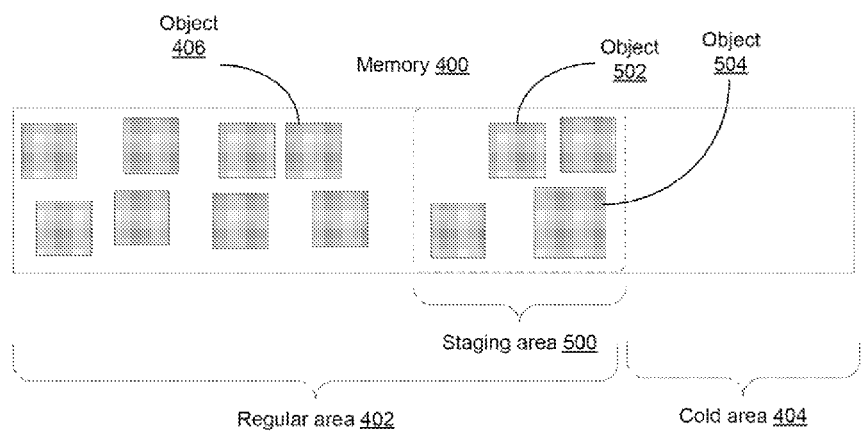
FIG. 5 is a block diagram of a memory configuration with staging area in accordance with one embodiment of the disclosure.

With reference to FIG. 5 a block diagram of a memory configuration with staging area in accordance, with various embodiments of the disclosure is presented. Staging area 500 is an example of a portion of memory managed by memory manager 300 of FIG. 3.

Using the previous example of memory 400 of FIG. 4, staging area 500 is created from a portion of memory previously defined as regular area 402. The creation of staging area 500 is performed by staging controller 302 of memory manager 300 of FIG. 3 using popularity data gathered by a data access frequency method to determine which area of a memory to convert into staging area 500. In one example, memory 400 is a regular Java heap, which is converted into staging area 500. In another example, staging area 500 may be created dynamically from a portion of regular area 402 or logically associated with regular area 402 but physically created on a different storage type and/or device. Staging area 500 may be created dynamically or statically using pre-allocation in conjunction with configuration information.

As time elapses and the popularity detection method obtains and processes data access information object access frequency becomes clearer. Memory manager 300 of FIG. 3 in an enhanced managed runtime groups the seemingly cold objects together into staging area 500, which is a part of regular area 402 and in one example using a technique of memory enable/disable as a tracking mechanism, disables all memory access to staging area 500. Object 502 and object 504, as well as other objects comprising a set of objects previously located in regular area 402, are located within staging area 500.

Disabling application access to memory comprising the staging area is one example embodiment of implementing the disclosed process. Embodiments of the disclosed process monitor and track all accesses made to the objects within the staging area using a selected tracking method from a set of tracking methods. For example, modifications may be incorporated into an operating system kernel to track memory accesses to certain memory ranges more thoroughly. A dedicated access tracking hardware/firmware solution may also be used with a solid-state disk when used to provide the staging area memory.

Figure 6:
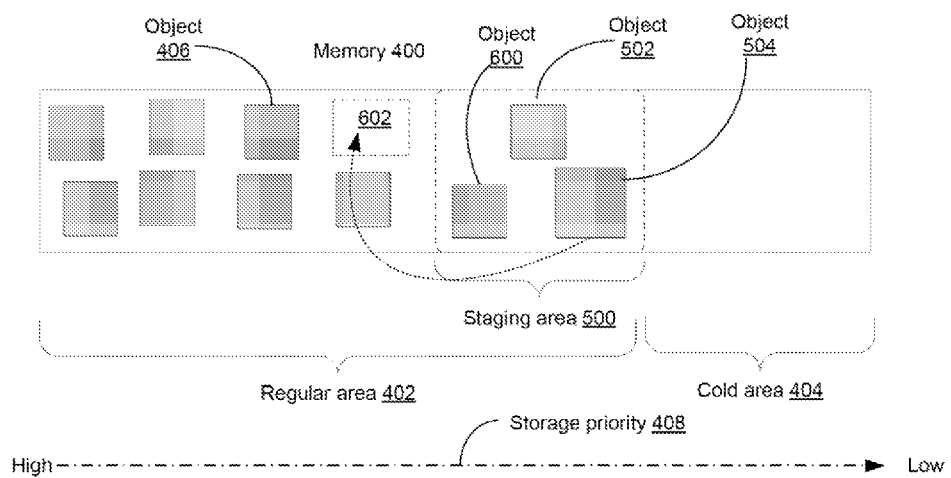
FIG. 6 is a block diagram of a memory configuration with staging area in accordance with one embodiment of the disclosure.

With reference to FIG. 6 a block diagram of a memory configuration with staging area in accordance, with various embodiments of the disclosure is presented. Staging area 500 is an example of a portion of memory managed by memory manager 300 of FIG. 3 from which object relocation is planned.

In one example, when memory access to staging area 500 is disabled, the application is completely unaware of the disabled status and continues to execute as usual. Since cold objects, such as object 502, object 504 and object 600, are still being used, although less frequently than others, the application attempts to read or write to the cold objects. An application request for a cold object, such as object 504, in staging area 500 triggers a memory protection fault using the example.

A signal handler of staging controller 302 of FIG. 3 handling staging area 500 catches the memory protection fault, records which object was accessed, updates an access frequency count associated with the object and temporarily allows access to the memory containing the object. An access frequency count is kept for all accessed objects in staging area 500 and when an object, such as object 504 is accessed too frequently the object is identified and prepared for relocation out of staging area 500 into location 602 of regular area 402. In another example, a page protection mechanism, memory cache/translation look aside buffer (TLB) frequency data, or hardware assisted profiling may trigger an access for an object in the staging area updating associated frequency of use information.

Figure 7:
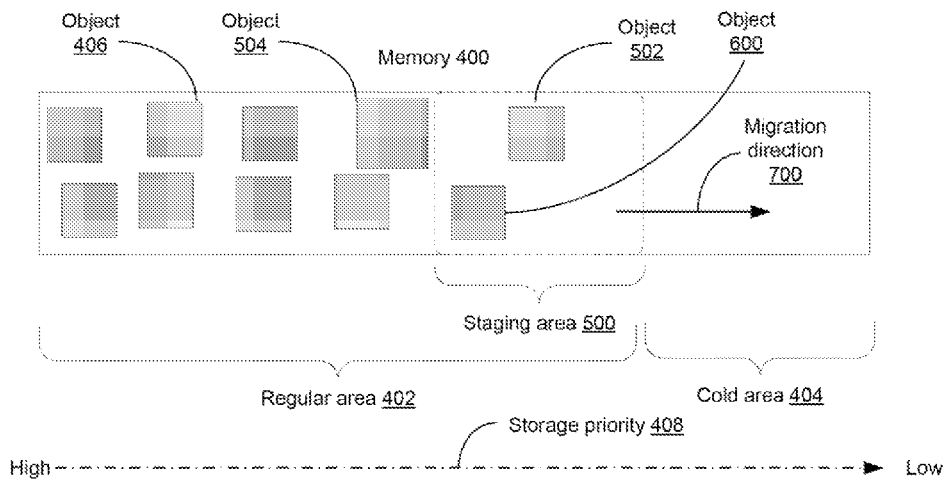
FIG. 7 is a block diagram of a memory configuration with staging area in accordance with one embodiment of the disclosure.

With reference to FIG. 7 a block diagram of a memory configuration with staging area in accordance, with various embodiments of the disclosure is presented. Staging area 500 is an example of a portion of memory managed by memory manager 300 of FIG. 3 from which an object is relocated to a regular area.

Object 504, accessed too frequently is relocated out of staging area 500 into regular area 402. In contrast with the movement of object 504 usual migrations of objects, for example, according to low access frequency information is indicated as migration direction 700 toward a portion of cold area 404 furthest from a portion of regular area 402.

Figure 8:
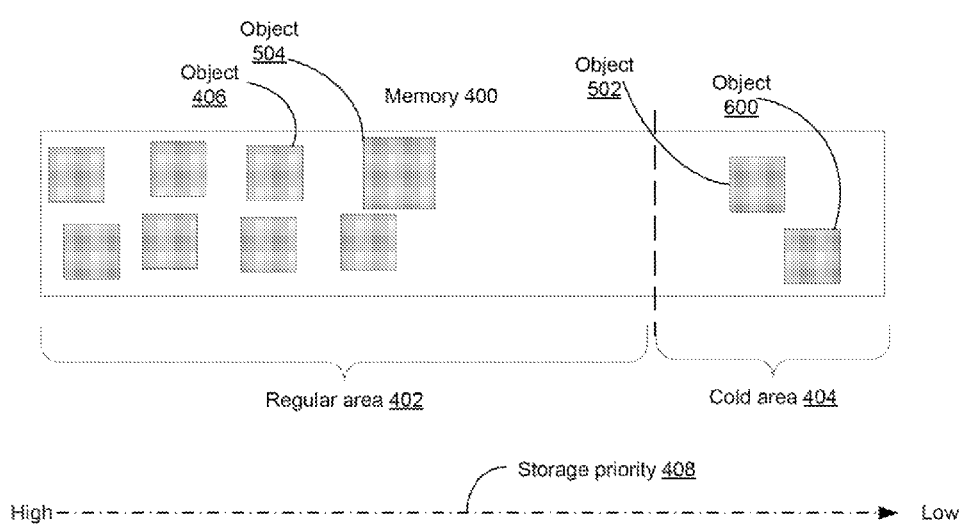
FIG. 8 is a block diagram of a memory configuration used with a memory manager in accordance with an illustrative embodiment of the disclosure.

With reference to FIG. 8 a block diagram of a memory configuration used with a memory manager in accordance, with various embodiments of the disclosure is presented. In the example, staging area 500 of a portion of memory managed by memory manager 300 of FIG. 3 is no longer required.

The usual migrations of objects, such as object 502 and object 600, according to low access frequency counts, as indicated by migration direction 700 of FIG. 7 toward a portion of cold area 404 furthest from a portion of regular area 402 has occurred. Storage area 500 of FIG. 7 has been deleted because a requirement for this level of storage no longer exists. Memory previously allotted to storage area 500 of FIG. 7 has been returned to a regular area 402. When storage area 500 is placed in a location other than regular area 402 the storage area is logically removed and awaits reuse.

Figure 9:
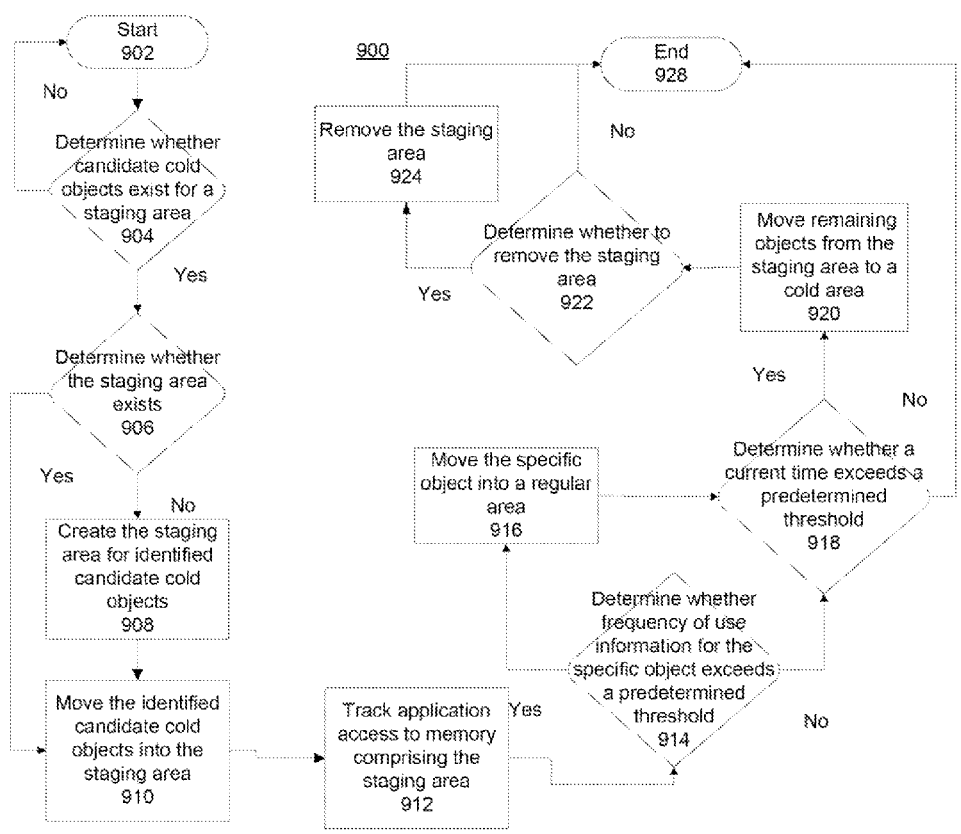
FIG. 9 is a flowchart of a process for managing a staging area in accordance with various embodiments of the disclosure.

With reference to FIG. 9 a flowchart of a process for managing a staging area in accordance, with various embodiments of the disclosure is presented. In the example, process 900 is an example of managing a staging area in a portion of memory managed by memory manager 300 of FIG. 3.

Process 900 begins (step 902) and determines whether candidate cold objects exist for a staging area (step 904). For example candidate cold objects may be identified using access frequency information obtained using a popularity detection method in which less frequently accessed objects are viewed as candidates for relocation to less performance intense memory. Responsive to a determination candidate cold objects do not exist for a staging area process 900 loops back to perform step 902 as before.

Responsive to a determination that candidate cold objects exist for a staging area process 900 determines whether the staging area exists (step 906). Responsive to a determination that the staging area does not exist process 900 creates the staging area for identified candidate cold objects (step 908). The staging area may be created using a default size obtained from a data structure associated with a memory manager such as a configuration file or property file. An initial size may be set which is less than or equal to a size of a cold area. The staging area may logically be a portion of a regular area of memory in use or another portion of a memory physically separate from the regular memory. The staging area may be allotted from a different type of memory than that of the regular area as well.

Responsive to a determination that the staging area exists process 900 moves the identified candidate cold objects into the staging area (step 910). The identified candidate objects are relocated from the regular area into the staging area. As stated previously the staging area may be a portion of the regular area or may be a physically different location and device.

Process 900 tracks application access to memory comprising the staging area (step 912). In one example, process 900 disables application access to memory comprising the staging area as a tracking mechanism for objects in the staging area. Disabling access to the memory of the staging area enables applications to continue to use and access objects in the staging area however a memory access fault will occur on each application request for an object in the staging area. In another example, an application access alerts an access tracking mechanism, such as a page request, of a desire to use a content of the staging area.

Process 900 updates access frequency information associated with each specific object in the staging area. When using another technique of monitoring and tracking access to the staging area no further permission may be required. In another example, process 900 maintains a data structure comprising an access list of objects in the staging area, updating the list for each additional object including incrementing a frequency of use indicator, such as an access count, representative of a number of accesses to an object and a last reference time as access frequency information.

Process 900 determines whether the frequency of use information for the specific object exceeds a predetermined threshold (step 914). Responsive to a determination that the frequency of use information for the specific object exceeds a predetermined threshold, process 900 moves the specific object into the regular area from the staging area (step 916).

Responsive to a determination that the frequency of use information for the specific object does not exceed a predetermined threshold, process 900 determines whether a current time exceeds a predetermined threshold (step 918). The current time is compared with a predetermined value for a time value representing a period or duration since a last access for a specific object. For example, when the current time is Y and an object has been accessed at X time, the difference is time Z and time Z does not exceed a predetermined threshold then retain the object otherwise flush the object. Responsive to a determination that the current time does not exceed a predetermined threshold, process 900 terminates (step 928).

Responsive to a determination that the current time exceeds a predetermined threshold, process 900 moves remaining objects from the staging area to a cold area (step 920). Process 900 determines whether to remove the staging area (step 922). Responsive to a determination to remove the staging area, process 900 removes the staging (step 924). The staging may be physically or logically removed depending on the current allocation form of the staging area. Responsive to a determination to not remove the staging area, process 900 terminates thereafter (step 928).

When an alternative example of disabling access to the memory is used, process 900 is aware of application access to the memory comprising the staging area was disabled. The memory comprising the staging area is now enabled. The memory previously used as the staging area is returned to the regular area because the staging area is no longer needed and the staging area is thus removed.

Thus is presented in an illustrative embodiment a computer-implemented process for managing a staging area. The computer-implemented process creates the staging area for identified candidate cold objects, moves the identified candidate objects into the staging area, tracks application access to memory comprising the staging area and determines whether frequency of use information for a specific object exceeds a predetermined threshold. Responsive to a determination that the frequency of use information for the specific object exceeds a predetermined threshold, move the specific object into a regular area and determine whether a current time exceeds a predetermined threshold. Responsive to a determination that the current time exceeds a predetermined threshold, the computer-implemented process moves remaining objects from the staging area to a cold area.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented process for managing a staging area, the computer-implemented process comprising:
    creating the staging area for identified candidate cold objects, the staging area being a data structure that is logically part of a regular area of memory where identified candidate cold objects are relocated in order to decide whether to move the identified candidate cold objects to a cold area and also to test consequences of moving the identified candidate cold objects;
    moving the identified candidate cold objects into the staging area;
    tracking application access to memory by disabling access to the memory of the staging area but still allowing the application to use and access the identified candidate cold objects in the staging area;
    determining whether frequency of use information based upon the number of memory access faults occurring when the application accesses the identified candidate cold objects in the staging area when the access to the memory of the staging area is disabled for a specific object exceeds a predetermined frequency threshold;
    responsive to a determination that the frequency of use information for the specific object exceeds the predetermined frequency threshold, moving the specific object into the regular area of memory from the staging area;
    determining whether a current time exceeds a predetermined time threshold; and,
    responsive to a determination that the current time exceeds the predetermined time threshold and also responsive to the determination that the frequency of use information for the specific object does not exceed the predetermined frequency threshold, moving remaining objects from the staging area to the cold area, the cold area comprising a relatively slower physical memory than a physical memory of the regular area of memory.

2. The computer-implemented process of claim 1, wherein creating the staging area for the identified candidate cold objects further comprises:
    determining whether candidate cold objects exist for the staging area; responsive to a determination candidate cold objects exist for the staging area, determining whether the staging area exists;
    responsive to a determination the staging area does not exist using a portion of the regular area of memory, wherein the memory is representative of a memory used by a managed runtime and wherein the memory is arranged in performance tiers comprising a high performance tier associated with the regular area of memory through to a lower performance tier of a cold area and wherein the memory comprises one of a different types of memory and a same types of memory; and,
    responsive to a determination the staging area does exist using the staging area.

3. The computer-implemented process of claim 1, wherein the creating the staging area for the identified candidate cold objects further comprises:
    tracking access patterns of objects using a selected method including a combination of methods selected from a set of methods including traditional read/write barriers, page protection mechanisms, memory cache and translation look aside buffer (TLB) frequency data, and hardware assisted profiling, wherein tracking information includes the frequency of use information including an access count incremented as a result of an access of a respective object in the memory and a time of last access;
    gathering information using the frequency of use information for each object comprising a set of objects in a regular memory using a popularity detection method selected from a set of methods; and,
    ranking each object set of objects according to the frequency of use information to form an access frequency.

4. The computer-implemented process of claim 1, wherein creating the staging area for identified candidate cold objects further comprises:
    reading a configuration data structure containing initialization values; and,
    creating the staging area of a size determined by an initial value in the configuration data structure, wherein the initial value represents a value selected from a predetermined number of objects and a size of a cold area.

5. The computer-implemented process of claim 1, wherein moving the identified candidate objects into the staging area further comprises:
    updating a time last accessed information associated with the object.

6. The computer-implemented process of claim 1, wherein moving remaining objects from the staging area to a cold area further comprises;
    determining whether to remove the staging area; and,
    responsive to a determination to remove the staging area, removing the staging area from the memory.

7. The computer-implemented process of claim 1, wherein tracking application access to memory further comprises detecting all actual object access.

8. A computer program product for managing a staging area, the computer program product comprising:

a non-transitory computer recordable-type media containing computer executable program code stored thereon, the computer executable program code comprising:

computer executable program code for creating the staging area for identified candidate cold objects, the staging area being a data structure that is logically part of a regular area of memory where identified candidate cold objects are relocated in order to decide whether to move the identified candidate cold objects to a cold area and also to test consequences of moving the identified candidate cold objects;

computer executable program code for moving the identified candidate cold objects into the staging area;

computer executable program code for tracking application access to memory by disabling access to the memory of the staging area but still allowing the application to use and access the identified candidate cold objects in the staging area;

computer executable program code for determining whether frequency of use information based upon the number of memory access faults occurring when the application accesses the identified candidate cold objects in the staging area when the access to the memory of the staging area is disabled for a specific object exceeds a predetermined frequency threshold;

computer executable program code for responsive to a determination that the frequency of use information for the specific object exceeds the predetermined frequency threshold, moving the specific object into the regular area of memory from the staging area;

computer executable program code for determining whether a current time exceeds a predetermined time threshold; and, computer executable program code for responsive to a determination that the current time exceeds the predetermined time threshold and also responsive to the determination that the frequency of use information for the specific object does not exceed the predetermined frequency threshold, moving remaining objects from the staging area to the cold area, the cold area comprising a relatively slower physical memory than a physical memory of the regular area of memory.

9. The computer program product of claim 8, wherein computer executable program code for creating the staging area for the identified candidate cold objects further comprises:

computer executable program code for determining whether candidate cold objects exist for the staging area;

computer executable program code responsive to a determination candidate cold objects exist for the staging area, for determining whether the staging area exists;

computer executable program code responsive to a determination the staging area does not exist for using a portion of the regular area of memory, wherein the memory is representative of a memory used by a managed runtime and wherein the memory is arranged in performance tiers comprising a high performance tier associated with the regular area of memory through to a lower performance tier of a cold area and wherein the memory comprises one of a different types of memory and a same types of memory; and, computer executable program code responsive to a determination the staging area does exist using the staging area.

10. The computer program product of claim 8, wherein computer executable program code for creating the staging area for the identified candidate cold objects further comprises:

computer executable program code for tracking access patterns of objects using a selected method including a combination of methods selected from a set of methods including traditional read/write barriers, page protection mechanisms, memory cache and translation look aside buffer (TLB) frequency data, and hardware assisted profiling, wherein tracking information includes the frequency of use information including an access count incremented as a result of an access of a respective object in the memory and a time of last access;

computer executable program code for gathering information using the frequency of use information for each object comprising a set of objects in a regular memory using a popularity detection method selected from a set of methods; and, computer executable program code for ranking each object set of objects according to the frequency of use information to form an access frequency.

11. The computer program product of claim 8, wherein computer executable program code for creating the staging area for identified candidate cold objects further comprises:

computer executable program code for reading a configuration data structure containing initialization values; and, computer executable program code for creating the staging area of a size determined by an initial value in the configuration data structure, wherein the initial value represents a value selected from a predetermined number of objects and a size of a cold area.

12. The computer program product of claim 8, wherein computer executable program code for moving the identified candidate objects into the staging area further comprises:

computer executable program code for updating a time last accessed information associated with the object.

13. The computer program product of claim 8, wherein computer executable program code for moving remaining objects from the staging area to a cold area further comprises:

computer executable program code for determining whether to remove the staging area; and, computer executable program code responsive to a determination to remove the staging area, for removing the staging area from the memory.

14. The computer program product of claim 8, wherein computer executable program code for tracking application access to memory further comprises computer executable program code for detecting all actual object access.

15. An apparatus for managing a staging area, the apparatus comprising:

a communications fabric;

a memory connected to the communications fabric, wherein the memory contains computer executable program code;

a communications unit connected to the communications fabric;

an input/output unit connected to the communications fabric;

a display connected to the communications fabric; and, a processor unit connected to the communications fabric, wherein the processor unit executes the computer executable program code to direct the apparatus to:

create the staging area for identified candidate cold objects, the staging area being a data structure that is logically part of a regular area of memory where identified candidate cold objects are relocated in order to decide whether to move the identified candidate cold objects to a cold area and also to test consequences of moving the identified candidate cold objects;

move the identified candidate cold objects into the staging area;

track application access to memory by disabling access to the memory of the staging area but still allowing the application to use and access the identified candidate cold objects in the staging area;

determine whether frequency of use information based upon the number of memory access faults occurring when the application accesses the identified candidate cold objects in the staging area when the access to the memory of the staging area is disabled for a specific object exceeds a predetermined frequency threshold;

responsive to a determination that the frequency of use information for the specific object exceeds the predetermined frequency threshold, move the specific object into the regular area of memory from the staging area;

determine whether a current time exceeds a predetermined time threshold; and responsive to a determination that the current time exceeds the predetermined time threshold and also responsive to the determination that the frequency of use information for the specific object does not exceed the predetermined frequency threshold, move remaining objects from the staging area to the cold area, the cold area comprising a relatively slower physical memory than a physical memory of the regular area of memory.

16. The apparatus of claim 15, wherein the processor unit executes the computer executable program code to create the staging area for the identified candidate cold objects further directs the apparatus to:

determine whether candidate cold objects exist for the staging area;

responsive to a determination candidate cold objects exist for the staging area, determine whether the staging area exists;

responsive to a determination the staging area does not exist use a portion of the regular area of memory, wherein the memory is representative of a memory used by a managed runtime and wherein the memory is arranged in performance tiers comprising a high performance tier associated with the regular area of memory through to a lower performance tier of a cold area and wherein the memory comprises one of a different types of memory and a same types of memory; and, responsive to a determination the staging area does exist, use the staging area.

17. The apparatus of claim 15, wherein the processor unit executes the computer executable program code to create the staging area for the identified candidate cold objects further directs the apparatus to:

track access patterns of objects using a selected method including a combination of methods selected from a set of methods including traditional read/write barriers, page protection mechanisms, memory cache and translation look aside buffer frequency data, and hardware assisted profiling, wherein the frequency of use information including includes an access count incremented as a result of an access of a respective object in the memory and a time of last access;

gather information using the frequency of use information for each object comprising a set of objects in a regular memory using a popularity detection method selected from a set of methods; and, rank each object set of objects according to the frequency of use information including to form an access frequency.

18. The apparatus of claim 15, wherein the processor unit executes the computer executable program code to create the staging area for identified candidate cold objects further directs the apparatus to:

read a configuration data structure containing initialization values; and, create the staging area of a size determined by an initial value in the configuration data structure, wherein the initial value represents a value selected from a predetermined number of objects and a size of a cold area.

19. The apparatus of claim 15, wherein the processor unit executes the computer executable program code to move the identified candidate objects into the staging area further directs the apparatus to:

update a time last accessed information associated with the object.

20. The apparatus of claim 15, wherein the processor unit executes the computer executable program code to move remaining objects from the staging area to a cold area further directs the apparatus to;

determine whether to remove the staging area; and, responsive to a determination to remove the staging area, remove the staging area from the memory.

\* \* \* \* \*